United States Patent [19]

Persons, II

[11] Patent Number: 4,475,770

[45] Date of Patent: Oct. 9, 1984

[54] ADJUSTABLE BACKREST FOR CYCLE TYPE SEAT

[75] Inventor: Charles Persons, II, Boca Raton, Fla.

[73] Assignee: Persons-Majestic Manufacturing Co., Monroeville, Ohio

[21] Appl. No.: 294,372

[22] Filed: Aug. 19, 1981

[51] Int. Cl.³ .................................... A47C 1/024
[52] U.S. Cl. ................... 297/353; 297/355; 297/357; 297/358; 297/DIG. 9
[58] Field of Search ........ 297/353, 357, 358, 363–365, 297/352, 355, DIG. 9

[56] References Cited

U.S. PATENT DOCUMENTS

| 620,688 | 3/1899 | Wood | 297/DIG. 9 X |
| 636,222 | 10/1899 | Killen | 297/DIG. 9 X |
| 1,652,165 | 12/1927 | Craven | 297/357 X |
| 1,922,418 | 8/1933 | Cohant | 297/358 X |
| 2,158,453 | 5/1939 | Wood | 297/358 X |
| 3,235,308 | 2/1966 | Conner | 297/357 X |
| 3,698,762 | 10/1972 | Gorman | 297/DIG. 9 X |

FOREIGN PATENT DOCUMENTS

| 632970 | 12/1961 | Canada | 297/353 |
| 1324973 | 3/1963 | France | 297/353 |

Primary Examiner—William E. Lyddane

[57] ABSTRACT

A backrest for use with devices having cycle-type seats mounted on support posts, such as exercise machines, bicycles, tricycles, stools and the like, in which the back support is pivotally attached to a support frame and the support frame is selectably adjustable in height and in angle with respect to the seat of said machine. The support frame is adjustably secured to a yoke which in turn is clamped to the support post of the seat.

13 Claims, 2 Drawing Figures

ADJUSTABLE BACKREST FOR CYCLE TYPE SEAT

Exercise machines, including those simulating rowing and bicycling, typically are fitted with backless cycle-type seats or saddles to support the user. For example, rowing machines generally have a seat slidable on a track in coordination with the rowing exercise. Bicycle exerciser machines generally are fitted with a conventional saddle. Cycles of most types are conventionally fitted with cycle-type seat mounted on a support post, and other devices such as stools are known which have cycle-type saddles. Such seats or saddles generally include a narrow leading end portion with a downwardly contoured tip and a flared wider trailing end portion with a downwardly extending periphery. A socket or clamp is provided for mounting the seat on a support post.

Backless seats in exercise machines and cycles encourage back fatigue in the user, so that exercise may be terminated earlier or be less vigorous than desired to prevent backstrain. In addition, the absence of a back support prevents the machine or cycle user from exerting maximum thrust and obtaining the desired degree of exercise or propulsion.

Backrests for bicycles, motorcycles and the like are known. For example of fixed position backrests, see U.S. Pat. No. 4,141,587 to Holcomb and U.S. Pat. No. 3,879,087 to Russo. Cycle backrests having some adjustability have also been disclosed. In U.S. Pat. No. 3,887,231, Bochynsky discloses a "flip-up" backrest which provides a limited height back support adjoining a motorcycle seat. U.S. Pat. No. 3,822,917 discloses a higher backrest which has a number of selectable, fixed angular positions and is especially adapted for use with a "buddy seat" on a motorcycle. None of the disclosed seats are adapted to accomodate anticipated pedaling or exercise motion of the user. In addition to accomodating user motion, an exerciser or cycle seat backrest should adjust to provide users of difference sizes and shapes with effective lumbar support.

Accordingly, it is an object of the present invention to provide a backrest for a cycle-type seat or saddle that is adjustable to accomodate users of difference sizes and shapes. It is further an object of the invention to provide a backrest which provides support to the user during pedaling or throughout an exercise cycle.

The objects of the invention are accomplished in its preferred form by providing a back support pivotally attached to a support frame. The support frame holds the back support above the saddle. The frame is adjustably secured to a yoke, so that the height and angle of the frame, and thereby of the back support, with respect to the saddle, can be selectably fixed at any of a plurality of selectable positions. The yoke includes a clamp for clamping it to the cycle or exerciser. In preferred embodiments of the invention, the adjustments of height and angle can be made without the use of tools.

The foregoing and further features and advantages of the present invention will become apparent by reference to the accompanying drawing taken in conjunction with the detailed description of the preferred embodiment.

DESCRIPTION OF THE PREFERRED EMBODIMENT

Figure 1:
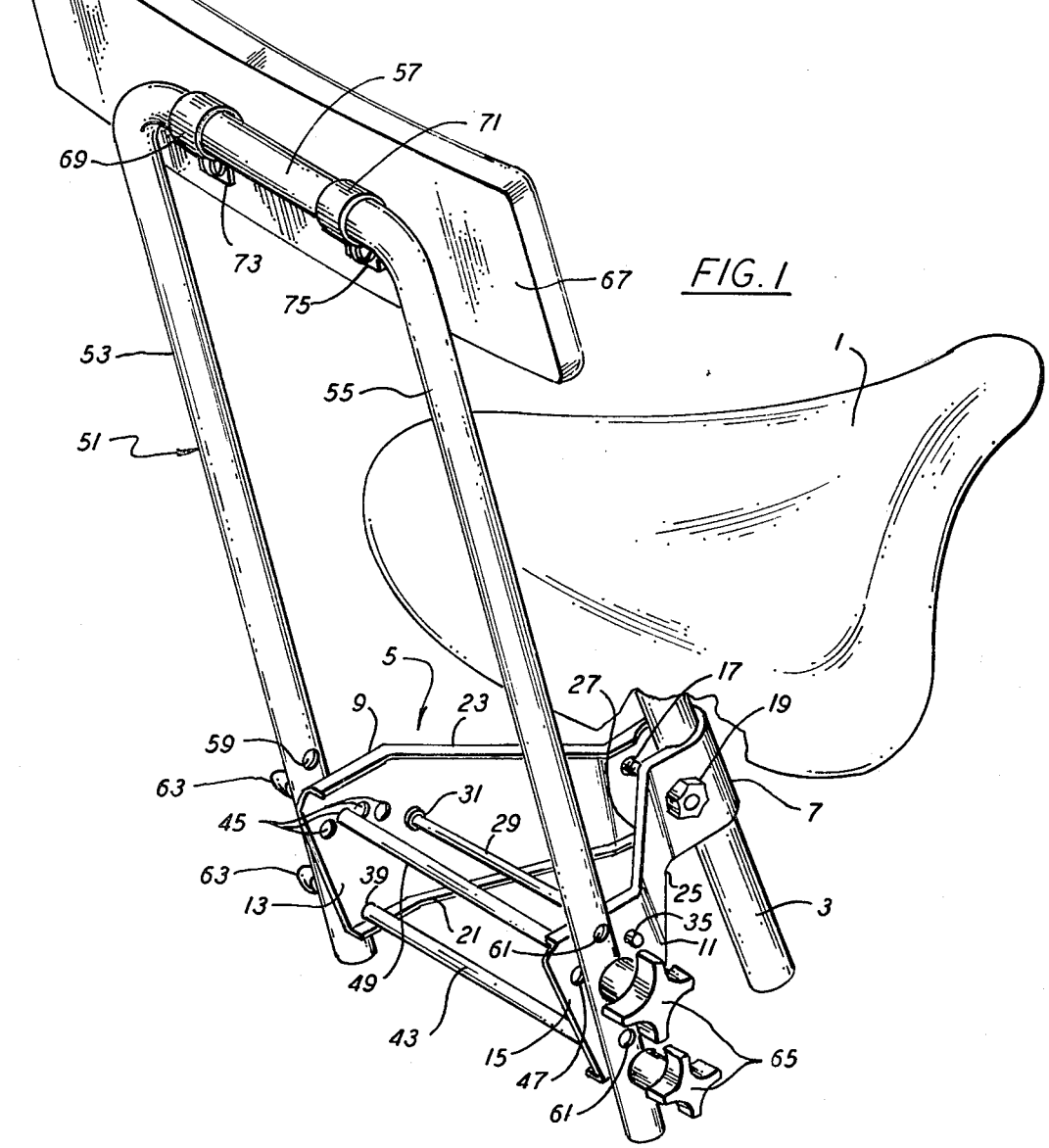
FIG. 1 is a partially cut away, perspective view of a cycle-type saddle with a backrest according to the present invention.

Turning to FIG. 1, there is shown a seat 1 having a central support 3. Preferably, seat 1 is a conventional saddle, i.e., bicycle type seat, having a conventional supporting structure (not shown) which includes a conventional clamp (not shown) that attaches to support 3. Seat 1 could be any type of cycle-type seat and could be supported on more than one support within the scope of the invention. It is intended that a central member, which need not necessarily be a seat support, project from beneath the seat for attachment of the backrest of the invention.

A yoke is affixed through a clamping means 7 to support 3. (A portion of seat 1 is cut away in FIG. 1 to show support 3 clearly.) Yoke 5 has two diverging flanges 9 and 11 which are generally symmetrical, and which terminate in generally parallel distal portions 13 and 15, respectively. Flanges 9 and 11 are joined by clamping means 7 which is shaped to conform generally to the circumference of central seat support 3. Clamping means 7 is firmly clamped to support 3 by a compression means. In the preferred embodiment, the compression means comprises a bolt 17 and an engaging nut 19 passing through a pair of aligned apertures in clamping means 7 opposite the part of means 7 which conforms to support 3. To increase the rigidity of flanges 9 and 11, their longitudinal edges are folded approximately 90 degrees inward to form lips 21 and 23 along the lower and upper edges, respectively, of flange 9 and to form lips 27 (only one of which is visible in FIG. 1) along the upper and lower edges, respectively, of flange 11.

An optional stabilizing bar 29 may also be inserted between distal portions 13 and 15 of flanges 9 and 11 to aid rigidity of yoke 5. In the embodiment of FIG. 1, bar 29 is fitted with a pair of collars 31 (only one of which is visible in FIG. 1), affixed, respectively, near each end of bar 29. The end of bar 29 are inserted in aligned holes 35 (only one of which is visible in FIG. 1) located in distal portions 13 and 15, respectively. It may be necessary to spread the flanges of yoke 5 slightly to insert bar 29. Bar 29 with collars 31 and 33, prevents the flanges from bending inward under the influence of compressive forces.

A pair of aligned apertures 39 (only one of which is visible in FIG. 1) are bored in flanges 9 and 11, respectively, proximate their distal lower edges for receiving a first rod or tube 43. A plurality of pairs of aligned apertures 45 and 47 are bored in flanges 9 and 11, respectively, proximate their distal upper edges, for receiving a second rod or tube 49. The axes of apertures 45 and 47 are arcuately arranged, approximately equidistant from the axes of apertures 39.

A generally U-shaped support frame 51 comprises two generally parallel longitudinal sections 53 and 55 connected by a shorter lateral section 57. Frame 51 is preferably of unitary tubular construction and longitudinal sections 53 and 55 have an inside spacing approximately equal to the outside span of generally parallel distal portions 13 and 15 of flanges 9 and 11. Near the ends of sections 53 and 55 opposite section 57 are drilled a plurality of pairs of aligned apertures 59 and 61, in sections 53 and 55 respectively, for receiving rods 43 and 49. Frame 51 is fitted over flanges 13 and 15 with rods 43 and 49 passing through both the flanges and frame sections 53 and 55. In order to achieve that arrangement, apertures 59 and 61 are drilled on axes approximately parallel to the axis of section 57 and the spacing of each set of apertures in each of frame sections 53 and 55 must be approximately the same as the separations of apertures 39 and 45 in flange portion 13. That is, in each longitudinal frame section, the apertures are arranged in pairs, with the members of each pair having the same spacing from each other as the corresponding apertures in the flange portion with which they are alignable. In FIG. 1, two pairs of apertures, i.e., four holes, are shown in each longitudinal frame section allowing alignment with the corresponding flange apertures in at least two, and possibly three, different positions when lateral section 57 is in its intended position above the top side of seat 1. Additional pairs of apertures would increase the number of different positions. Together, the alignable apertures in frame 51 and flange portions 13 and 15 along with rods 43 and 49 provide an adjustment means for adjusting and selectably fixing the backrest in a user-selected position. Rods 43 and 49 comprise a locking means for locking the aligned apertures in alignment.

Rods 43 and 49 can preferably be fixed in place while passing through flange portions 13 and 15 and frame sections 53 and 55 by a tensioning means. In the preferred embodiment depicted in FIG. 1, one end of each of rods 43 and 49 is fitted with a stop means to prevent that end from being drawn through the adjacent apertures in the frame means. In the preferred embodiment, the stop means comprises a first threaded length (not visible in FIG. 1) on one end of each of rods 43 and 49 engaged by a knob or nut means 63 having dimensions exceeding those of the apertures in the frame sections. The stop means could also include a washer firmly fixed to an end of each rod and larger than the apertures bearing the rods. In the preferred embodiment of FIG. 1, the tensioning means comprises a second threaded length on rods 43 and 49, opposite the ends having the first threaded length and a nut or knob means 65 engaging the second threaded lengths. The knobs shown in FIG. 1 have four equally spaced projecting protrusions which permit tightening and loosening of the tensioning means without the use of tools. Other sorts of plain or scalloped knobs or washers and nuts or the like may likewise be used to fix rods 43 and 49 within the selected aligned apertures. Optional stabilizing bar 29 aids in obtaining a firm clamping of rods 43 and 49 against flanges 13 and 15.

A pivot means connects lateral frame section 57 to a back support 67. In the preferred embodiment of FIG. 1, the pivot means comprises two generally symmetrically disposed loops 69 and 71, which encircle and loosely slip around the lateral section, having tangentially bent ends 73 and 75, for connection to back support 67. The method of attachment of the ends 73 and 75 to back support 67 depends upon the materials employed; in the preferred embodiment, a screw or bolt and nut is used. Preferably, back support 67 is curved generally to conform to the shape of the human back and is padded on the side contacting the user's back. An easily cleanable covering, such as vinyl, preferably covers back support 67.

Figure 2:
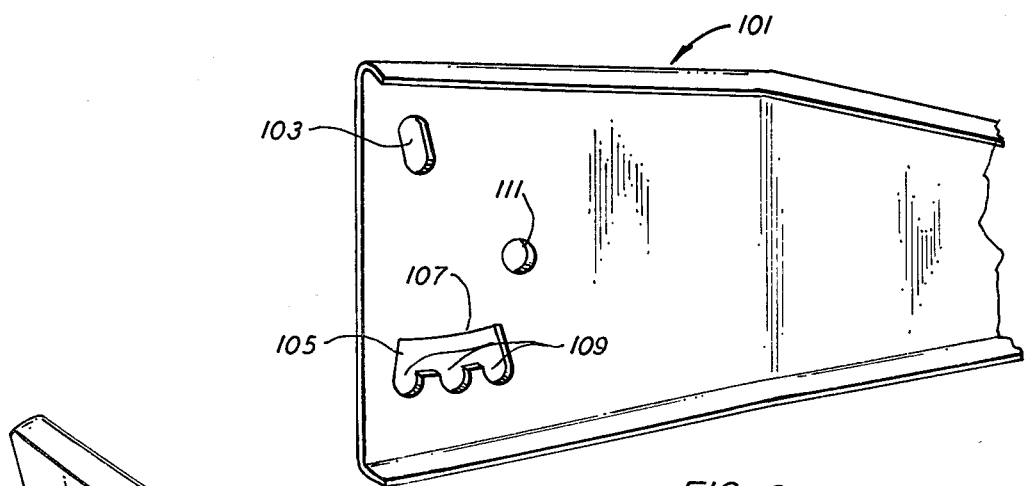
FIG. 2 is a perspective view of a portion of an alternate embodiment of a cycle-type saddle with a backrest according to the present invention.

Referring now to FIG. 2, a portion of an alternative embodiment 101 of the flange 9 of FIG. 1 is shown. Except for the elements of alternative flange 101 described below, it is identical to flange 9 and particularly to its distal portion 13, so that reference may be made to the description of flange 9 for the portions of flange 101 not described below. Likewise, a generally symmetrical and opposing flange part would be used with flange 101 to form a yoke similar to yoke 5, so that description of such a yoke is not necessary. That is, the description that follows discusses only the difference of the alternative embodiment of the yoke from the yoke embodiment previously discussed.

Flange 101 contains in its upper distal portion an elongated hole 103. The elongation of hole 103 is in the direction of the longitudinal sections 55 and 53 of frame 51 when it is attached to the yoke. Near the lower distal end of flange 101 is a complex aperture 105 having a convex arcuate edge 107 opposite hole 103 and an opposing edge containing three distinct, arcuately, generally equally distributed edge insets 109 for receiving rod 43. The axes of the edge insets are generally equidistant from an axis of the lower portion of elongated hole 103. The diameters of the edge insets and of the ends of elongated hole 103 are generally the same as those of rods 43 and 49, respectively. Apertures 103 and 105 are intended to receive tubes or rods corresponding to rods 43 and 49, respectively, of FIG. 1. Hole 111 in flange 101 corresponds to hole 35 in flange 9 for retaining optional stabilizing bar 29.

The alternative embodiment of yoke 5 employing flange 101 and a symmetrical counterpart engage frame 51 with a rod or tube passing through hole 103 and its generally symmetrical counterpart and another rod or tube passing through aperture 105 and its generally symmetrical counterpart. The rods pass through apertures 59 and 61 of frame 51 as explained before in connection with FIG. 1. The lower rod rests in one of the edge insets 109 of aperture 105 and the upper rod rests in the lower portion of elongated hole 103. To adjust the angular position of back support 67 with respect to the yoke and seat 1, the frame is lifted to raise the lower rod from an edge inset 109, thereby raising the upper rod in hold 103. The angle of back support 67 and frame 51 is then changed by pivoting on the upper rod to align the lower rod with another edge inset 109 of aperture 105. Upon alignment, the frame is released so that the rods settle to the lower portion of hole 103 and an inset edge 109 of aperture 105. As is obvious to the skilled artisan, the separation of the rods, i.e., of apertures 59 and 61 in frame 51, must correspond to the separation of the insets 109 of aperture 105 and the lower part of hole 103 in flange 101. Sufficient clearance must be provided in the upper part of hole 103 and the arcuate portion 107 of aperture 105 to allow the pivoting of the frame. The rods are held by a tensioning means in the manner previously described. The advantage of the alternative embodiment in which the backrest adjustment means comprises hole 103 and aperture 105 and their symmetrical counterparts, along with apertures 59 and 61, is that back support angle adjustments can be made without withdrawing the rods from apertures 59 and 61 in frame 51. By contrast, back support angle adjustments with the yoke depicted in FIG. 1, requires withdrawal of the rods from the aligned apertures. Of course, for back support height adjustments, withdrawal of the rods is required in both embodiments. A particular advantage of the embodiment of FIG. 1 is the absence of even a slight possibility of an unintentional release of the positioning of the backrest. Likewise, yoke 5 can be inverted, i.e., installed upside down, and still function normally. That is, apertures 39 and 45 (and their symmetrical counterparts) can be interchanged. With the alternative flange embodiment, complex aperture 105 must be near the lower edge of flange 101 to obtain proper and secure back support adjustment.

The backrest is simply installed on an exercise machine, cycle, stool or the like having a cycle-type seat. In the illustrated embodiments seat 1 is removed to expose central support 3. Yoke 5 is slipped over central support 3 and compression means 7 tightened to secure the yoke firmly to the support. If stabilizing bar 29 is provided, it is located within the yoke before tightening of compression means 7. Seat 1 is then reattached to support 3. Frame 51 is slipped over and outside flanges 13 and 15 with a selected pair of frame apertures 59, 61, aligned with respective aperture 39 and the selected ones of apertures 45, 47 in the flanges. The choice of apertures in frame 51 for alignment with the flange apertures determines the height of back support 67 above yoke 5. The choice made in a particular case is determined by the size of the user. The range of choices potentially available is limited solely by the length of the longitudinal portions 53 and 55 of frame 51, and the number of apertures drilled therein, and the requirement that the lower projecting ends of the frame not interfere with the operation of the device on which the seat is mounted. The choice of apertures 45 and 47 in flange portions 13 and 15 chosen for alignment with the apertures in frame 51 determines the relative angle between back support 67 and yoke 5. Since the axes of apertures 45 and 47 lie on arcs, any of them may be chosen for alignment. The variety of choices allows the user to select the best back support position for maximum user comfort. In the embodiment shown in FIG. 1, three heights and four angular options are provided so that twelve different positions are available. With a yoke employing the flange embodiment of FIG. 2 and the frame of FIG. 1, three heights and three angular options are provided, i.e., nine different positions are available. Of course, with either embodiment, greater or fewer apertures 45, 47 or edge insets 109, produce greater or fewer angular options.

After the selected apertures are aligned, with either of the embodiments of FIGS. 1 and 2, rods 43 and 49 are inserted through them and knob means 65 are threaded onto the rods and tightened. Obviously, apertures 39, 45, 47, 59 and 61 are intended to pass rods 49 and 45 easily, but without allowing a great deal of "play" so that firm positioning of frame 51 is produced when rods 43 and 49 are tensioned. The backrest is then ready for use.

The alternative embodiment yoke employing flanges of the type shown in FIG. 2, is installed in an analogous fashion. The principal installation difference is that the selection of apertures for the final adjustment of the angle of the back support need not be made before the rods are passed through the frame and flanges.

Since back support 67 is pivotally mounted on frame 51, it pivots to provide continuous support to the user of the exercise machine, cycle or the like as he sways or moves during rowing or pedaling or whatever activity is provided for. As a result, back fatigue is lessened for a given period of activity and activities of longer duration and/or greater vigor may be performed with the aid of the backrest than can be sustained without back support.

When a user wishes to use the backrest, he adjusts the angle and/or height of the back support with respect to the yoke. In the preferred embodiment of FIG. 1, a new user loosens knob means 65, withdraws rods 43 and 49, selects and aligns apertures 39, 45 and 59, and their counterparts to provide the desired height and angle, inserts the rods and tightens knob means 65. In the alternative embodiment of FIG. 2, rods 43 and 49 are merely loosened via knob means 65, if only angle is to be adjusted. The frame is lifted and reset to the desired angle and knob means 65 retightened. If the height of the backrest is to be adjusted, the procedure applicable to the embodiment of FIG. 1 must be followed. Of course, once the desired positioning is set, no change need be made unless a different size user seeks to use the device. The new user then selects the fixed angle and height that best suits him using the above-described procedure.

The invention has thus been described in detail with emphasis on the preferred embodiment. It should be understood that variations and modifications within the spirit and scope of the invention may occur to those skilled in the art to which the invention pertains.

I claim:

1. An adjustable backrest for a cycle-type seat mounted on a support post, said backrest comprising:
   a yoke including clamping means for clamping said yoke to the post, said yoke having opposed flanges opposite said clamping means;
   a support frame;
   a back support;
   pivot means for pivotally attaching said back support to said frame; and
   adjustment means for selectably securing said support frame to said yoke to adjustably fix the height and angle of said back support with respect to said yoke; said adjustment means including a pair of apertures in each of said flanges and a plurality of pairs of apertures in said support frame alignable with said apertures in said flanges for selectably adjusting the height of said back support with respect to said yoke, and locking means for locking said aligned apertures in alignment.

2. The invention according to claim 1 wherein each of said flanges includes a plurality of arcuately arranged apertures alignable with said apertures in said support frame for selectably adjusting the angle of said back support with respect to said yoke.

3. The invention of claim 2 wherein said locking means comprises at least two rods for passing through said aligned apertures and tensioning means for fixing said rods within said aligned apertures.

4. The invention of claim 3 wherein said tensioning means comprises threaded ends on said rods and nut means for engaging said threaded ends.

5. The invention of claim 2 wherein said locking means comprises at least two tubes for passing through said aligned apertures and tensioning means for fixing said tubes within said aligned apertures.

6. The invention of claim 5 wherein said tensioning means comprises threaded ends on said tubes and nut means for engaging said threaded ends.

7. The invention according to claim 1 wherein one of said pair of apertures in said flange includes an upper elongated hole and the other of said pair of apertures in each said flange includes a lower complex aperture having multiple edge insets, said holes and insets being alignable with said apertures in said support frame for selectably adjusting the angle of said back support with respect to said yoke.

8. The invention of claim 7 wherein said locking means comprises at least two rods for passing through said aligned apertures and tensioning means for fixing said rods within said aligned apertures.

9. The invention of claim 8 wherein said tensioning means comprises threaded ends on said rods and nut means for engaging said threaded ends.

10. The invention of claim 7 wherein said locking means comprises at least two tubes for passing through said aligned apertures and tensioning means for fixing said tubes within said aligned apertures.

11. The invention of claim 10 wherein said tensioning means comprises threaded ends on said tubes and nut means for engaging said threaded ends.

12. The invention of claim 1 including a stabilizing bar inserted between said flanges to aid rigidity of said yoke against compressive forces.

13. An adjustable backrest for a cycle-type seat mounted on a post of an exercise machine, bicycle, stool or the like, said backrest comprising:
    a yoke having rearwardly extending spaced flanges with aligned pairs of angularly spaced apertures, and clamping means for attaching said yoke to the post;
    a support frame having generally vertical members attachable to said flanges, said vertical members having aligned pairs of apertures alignable with selected pairs of apertures in said flanges; and
    a plurality of rods passing through selected pairs of apertures of said support frame and of said flanges, for mounting said support frame at selected heights and angles with respect to the seat.

* * * * *